(12) United States Patent
Godbey (10) Patent No.: US 9,488,232 B1
(45) Date of Patent: Nov. 8, 2016

(54) EXTERNALLY ADJUSTABLE CLUTCH (71) Applicant: Columbus McKinnon Corporation, Amherst, NY (US)

(72) Inventor: Jared B. Godbey, Washington, VA (US)

(73) Assignee: Columbus McKinnon Corporation, Getzville, NY (US)

( * ) Notice: Subject to any disclaimer, the term of this patent is extended or adjusted under 35 U.S.C. 154(b) by 34 days.

(21) Appl. No.: 14/741,003

(22) Filed: Jun. 16, 2015

(51) Int. Cl.
F16D 13/50 (2006.01)
F16D 7/02 (2006.01)
F16D 43/21 (2006.01)
F16D 13/46 (2006.01)
F16H 35/00 (2006.01)
B66D 3/22 (2006.01)

(52) U.S. Cl.
CPC ............... F16D 13/46 (2013.01); B66D 3/22 (2013.01); F16D 7/024 (2013.01); F16D 13/50 (2013.01); F16D 43/213 (2013.01); F16H 35/00 (2013.01)

(58) Field of Classification Search
CPC .......... F16D 7/02; F16D 7/024; F16D 7/025; F16D 7/028; F16D 13/46; F16D 13/48; F16D 13/50; F16D 43/21; F16D 43/213; F16D 43/215; F16D 43/218
See application file for complete search history.

(56) References Cited

U.S. PATENT DOCUMENTS

| 1,807,210 | A |   | 5/1931 | Hinnekens |  |
|---|---|---|---|---|---|
| 2,953,911 | A |   | 9/1960 | Tigerman |  |
| 3,825,100 | A | * | 7/1974 | Freeman | B66D 3/18 188/218 XL |
| 4,645,472 | A | * | 2/1987 | Heidenreich | F16D 7/025 192/30 W |
| 5,533,712 | A |   | 7/1996 | Fujikawa et al. |  |
| 5,575,456 | A | * | 11/1996 | Raphael, III | B66D 3/14 192/93 A |
| 5,853,165 | A |   | 12/1998 | Kuivamaki |  |
| 7,591,357 | B2 |   | 9/2009 | Antchak et al. |  |
| 2012/0031726 | A1 |   | 2/2012 | Grubb et al. |  |

FOREIGN PATENT DOCUMENTS

| DE | 4408578 A1 | 9/1995 |
| DE | 19757500 C1 | 8/1999 |
| DE | 19927847 C1 | 10/2000 |
| DE | 102004054890 B3 | 6/2006 |
| GB | 2321504 A | 7/1998 |

* cited by examiner

Primary Examiner — Jacob S Scott
(74) Attorney, Agent, or Firm — Phillips Lytle LLP (57) ABSTRACT An adjustable clutch assembly comprising a base portion, a clutch housing cap, a first rotary member having a first torque transfer surface rotatable about a clutch axis and a second rotary member having a second torque transfer surface opposing said first torque transfer surface, a spring element configured to bias the opposed first and second torque transfer surfaces towards each other, a gear drive comprising a wheel engaging the clutch housing cap and a shaft engaging the wheel, a locking element constraining rotational movement of the clutch housing cap relative to the base portion, the gear drive, base portion, locking element and clutch housing cap configured such that selective rotation of the wheel about the clutch axis causes axial movement of the clutch housing cap along the clutch axis relative to the base portion, whereby the bias of the spring may be adjusted.

19 Claims, 5 Drawing Sheets

EXTERNALLY ADJUSTABLE CLUTCH

TECHNICAL FIELD

The present invention relates generally to the field of clutches and, more particularly, to an improved externally adjustable clutch for preventing the transmission of excessive torque in, for example, hoist systems.

BACKGROUND ART

Clutches are well known in the art and are generally used to transmit force between two rotating shafts. One of the shafts is typically attached to a motor, sometimes referred to as the driving member, and the other shaft provides output power for work to be done, often referred to as the driven member. The clutch connects the two shafts across a slip joint so that they can be either engaged so that they spin at the same speed, or decoupled and disengaged so they spin at different speeds.

German Patent Publication DE102004054890 B3 is directed to a clutch that is adjusted by tightening a compression nut positioned outside of a spring on the threaded end of a rod that is connected at the other end to a pressure disk which is pressured to increase friction against a movable friction plate.

German Patent Publication DE19927847 C1 is directed to a slip clutch that is adjusted by tightening a compression nut positioned outside of a spring on one end of a threaded pull rod that is connected at the other end to a pressure disk which is pressured to increase friction between clutch discs.

U.S. Pat. No. 5,853,165 is directed to a clutch in which the preload of disks is provided by a nut acting on a helical spring and screwed onto a corresponding thread on a stub shaft that projects beyond the clutch disk and a second spring.

German Patent Publication DE4408578 A1 is directed to a slip clutch which can be adjusted without opening the casing. A shaft carries an external thread onto which a nut is screwed. A compression spring acts between the nut and a bearing such that the spring bias force on friction rings can be adjusted.

United Kingdom Patent Application GB2321504 A is directed to a slip clutch in which the amount of friction force is varied by rotation of an adjustment member on a threaded shaft portion.

U.S. Pat. No. 5,533,712 is directed to a slip clutch having an elastic member and an adjustment member.

DE19757500 is directed to a clutch with an adjustment mechanism comprising a compression spring in a cap having a threaded ring that is in threaded engagement with a threaded portion of a shaft.

U.S. Pat. No. 1,807,210 is directed to a friction coupling and generally discloses a key gear having a hub, follower ring, spring and cylindrical shell.

U.S. Pat. No. 2,953,911 is directed to a drive coupling and discloses a driven plate with radial grooves, hub, driving plate, pressure plate and clutch springs.

U.S. Pat. No. 7,591,357 is directed to a crank shaft torque modulator and discloses a driven hub, clutch spring, carrier disk, thrust washer, crank shaft pulley and mounting hub.

BRIEF SUMMARY OF THE INVENTION

With parenthetical reference to the corresponding parts, portions or surfaces of the disclosed embodiments, merely for purposes of illustration and not by way of limitation, the present invention provides an adjustable clutch assembly (15) comprising a base portion (18); a clutch housing cap (19); a first rotary member (20) having a first torque transfer surface (23); the first rotary member configured to rotate about a clutch axis (22) and to rotationally couple to a first shaft; a second rotary member (21) having a second torque transfer surface (24) opposing said first torque transfer surface of said first rotary member at a slip joint (25); the second rotary member configured to rotate about the clutch axis and to rotationally couple to a second shaft; a spring element (26) disposed axially between the clutch housing cap and the first rotary member and configured to bias the opposed first and second torque transfer surfaces axially towards each other; a gear drive (28) comprising a wheel (29) configured to rotate about the clutch axis and a shaft (30) in engagement with the wheel and configured to rotate about an adjustment axis (31) to thereby selectively rotate the wheel about the clutch axis; the wheel in engagement with the clutch housing cap; the shaft having a first portion (32) to which an adjustment torque may be applied; a locking element (34) constraining rotational movement of the clutch housing cap relative to the base portion; and the gear drive, the base portion, the locking element and the clutch housing cap configured such that selective rotation of the wheel about the clutch axis causes axial movement of the clutch housing cap along the clutch axis relative to the base portion or the second rotary member; whereby the bias of the spring may be adjusted by rotation of the shaft.

The first rotary member may be a driving member and the second rotary member may be a driven member. The first torque transfer surface may comprise a friction liner layer (35). The spring element may comprise a cylindrical compression spring oriented about the clutch axis.

The clutch housing cap may comprise a spring seat (36) axially retaining a first end of the spring and the assembly may further comprise a spring cup (38) receiving a second end of the spring. The assembly may further comprise a bearing (39) disposed axially between the spring cup and the first rotary member and disposed radially between the first rotary member and the clutch housing cap. The assembly may further comprise a cylindrical bushing (40) disposed radially between the bearing and the clutch housing cap.

The wheel may comprise an outer cylindrical surface having outwardly extending circumferentially spaced teeth (41) and the shaft may comprise an outer cylindrical surface having a threaded portion (42), and the engagement of the wheel with the shaft may comprise the threaded portion of the shaft rotationally engaging the teeth of the wheel. The first portion of the shaft may comprise a recess (33) configured to receive a torqueing tool. The clutch housing cap may comprise an outer cylindrical surface having a threaded portion (43) and the wheel may comprise an inner cylindrical surface having a threaded portion (44), and the engagement of the wheel with the clutch housing cap may comprise the threaded portion of the inner cylindrical surface of the wheel rotationally engaging the threaded portion of the outer cylindrical surface of the clutch housing cap.

The locking element may comprise an annular locking plate (34) fixed to the base portion and engaging an outer surface of the clutch housing cap. The annular locking plate may comprise multiple protrusions (45a-c) extending radially inwards towards the clutch axis and the outer surface of the clutch housing cap may comprise multiple axially extending grooves (46a-c), wherein the protrusions may slide axially relative to the clutch axis in the grooves and are constrained from rotational movement about the clutch axis by the grooves, whereby the clutch housing cap is axially movable relative to the base portion and rotationally constrained relative to the base portion. The annular locking plate may be fixed to the base portion via a plurality of shaft elements (48a-c). The wheel may be rotationally supported by a plurality of bearings (49a-c) and the bearings may be supported between the annular locking plate and the base portion on the respective shaft elements. The shaft elements may comprise turn studs and the assembly may further comprise multiple spring elements (50a-c) disposed between the annular locking plate and the respective bearings on the respective turn studs and configured to bias the locking plate away from the base portion.

The assembly may further comprise a hoist housing (16) fixed to the base portion and a second bearing (51) disposed radially between the second rotary member and the hoist housing. The second rotary member may comprise an outer journal (52) for receiving the second bearing.

The first rotary member (20) and the spring element (26) may be disposed between the base portion (18) and the clutch housing cap (19); the clutch housing cap may have an inner surface (55) and the first rotary member may have a surface (53) opposing the inner surface of the clutch housing cap; the spring element may act between the inner surface of the clutch housing cap and the surface of the first rotary member opposing the inner surface of the clutch housing cap; and the clutch housing cap and the first rotary member may be configured such that axial movement of the clutch housing cap relative to the first rotary member adjusts the bias of the spring element. The gear drive may be disposed outside of the clutch housing cap.

DETAILED DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 1:
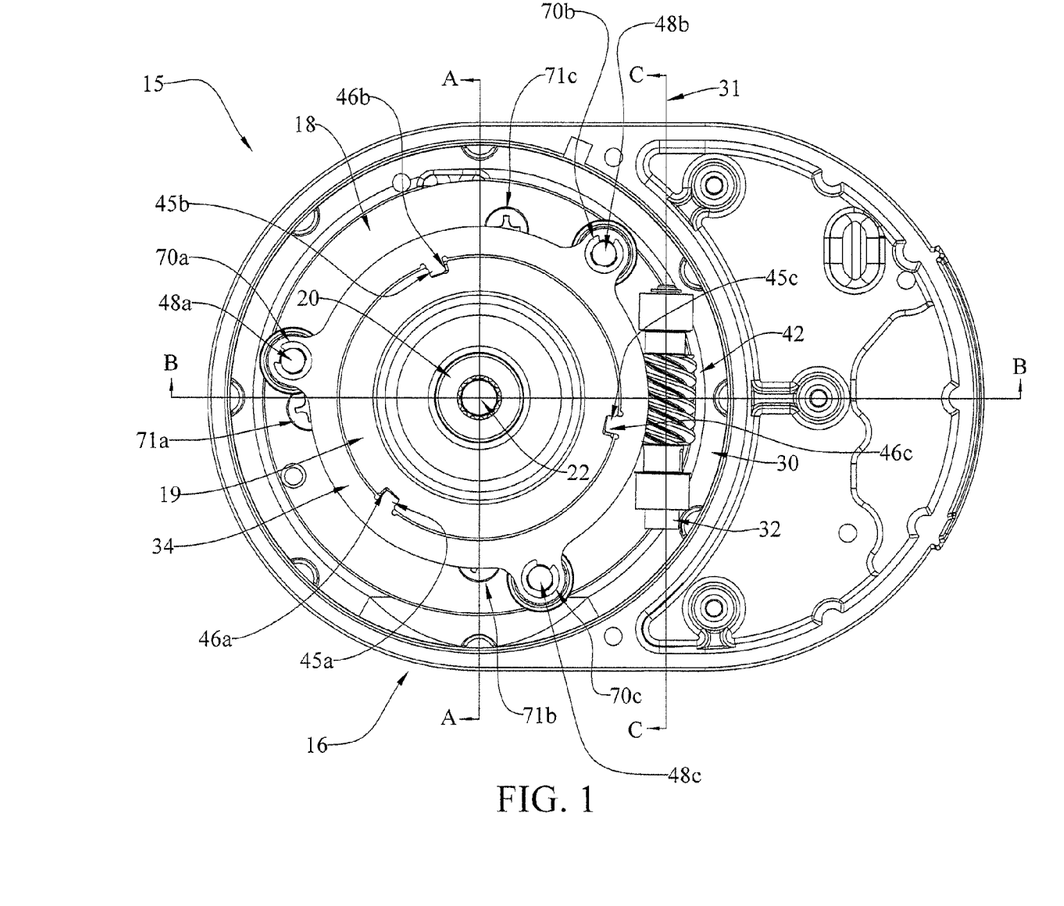
FIG. 1 is a top plan view of an embodiment of the improved clutch.
Figure 2:
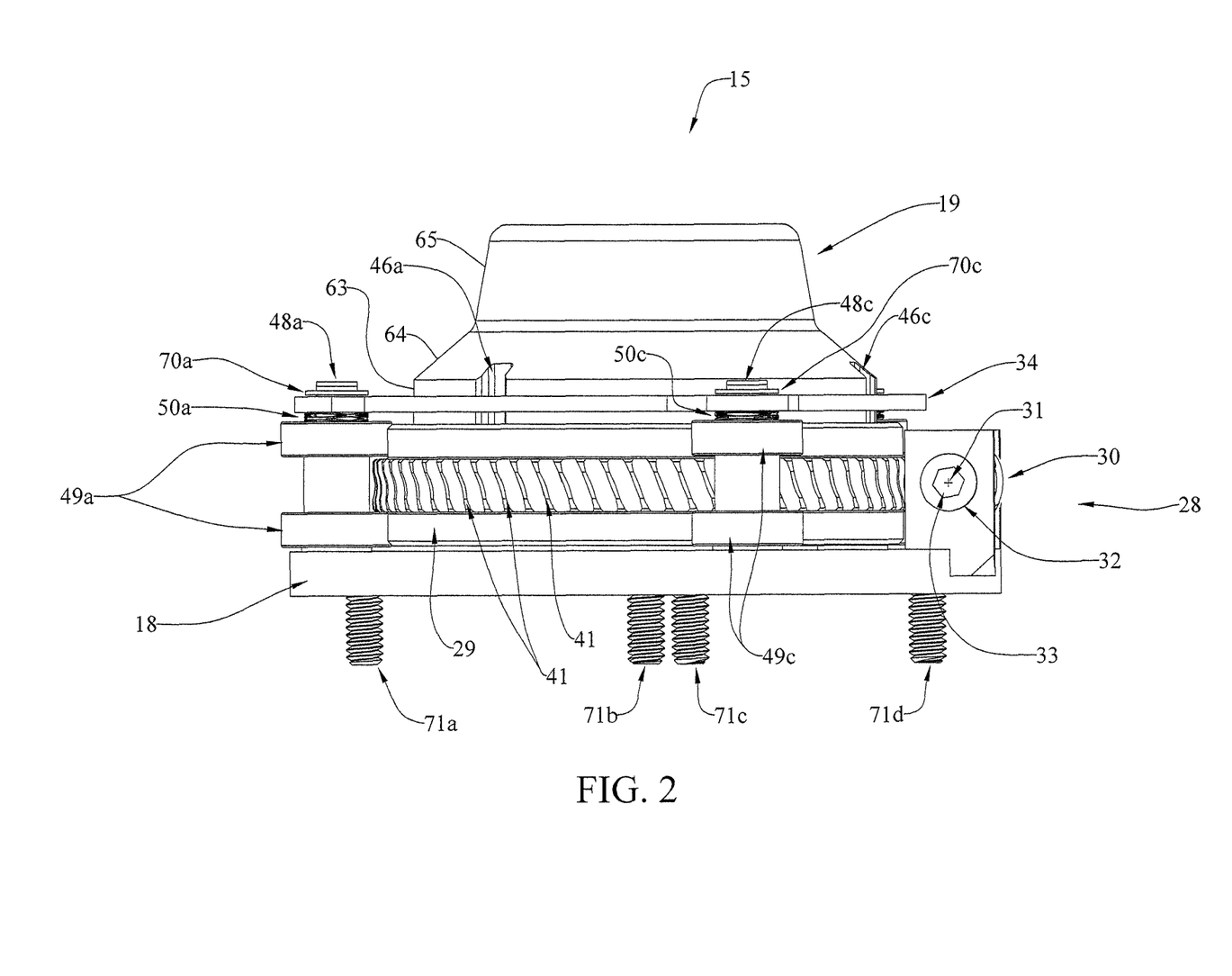
FIG. 2 is a front partial view of the clutch shown in FIG. 1
Figure 3:
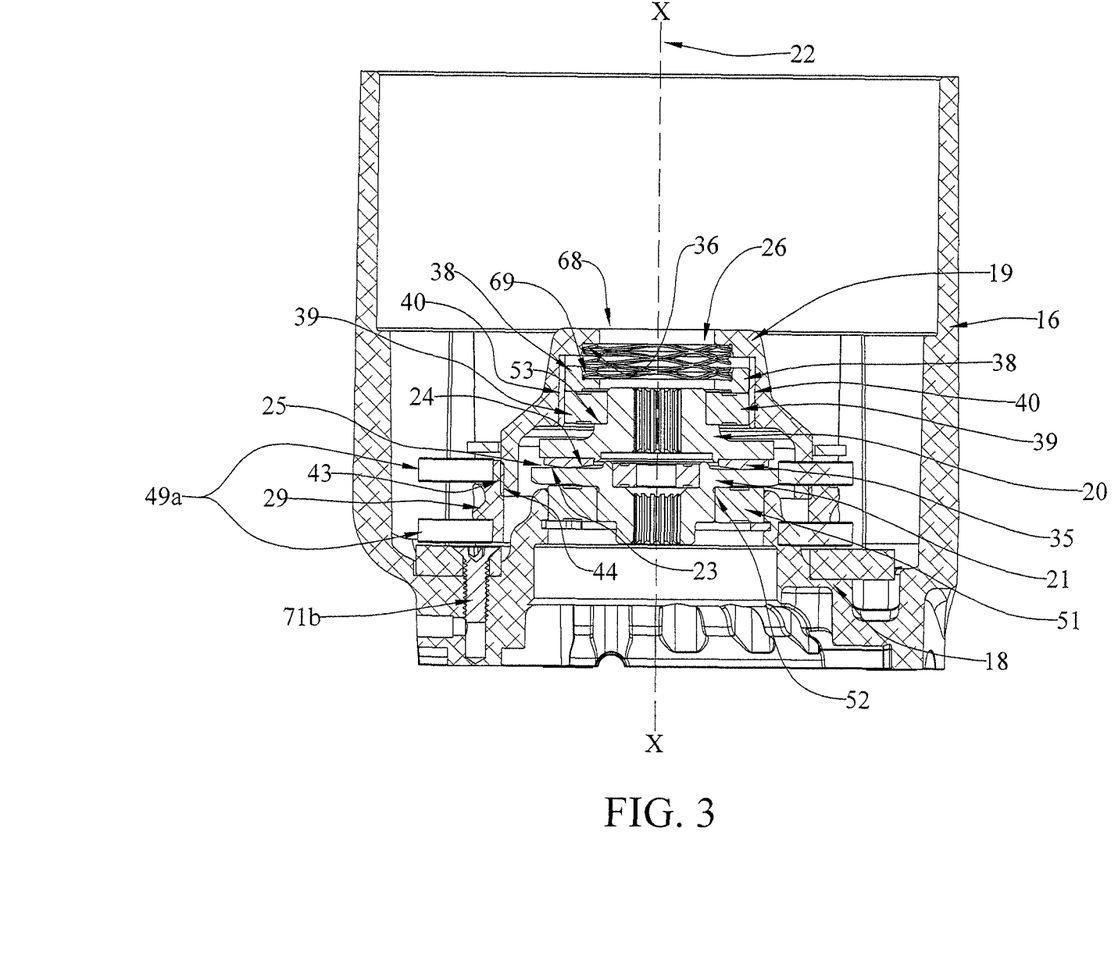
FIG. 3 is a vertical cross-sectional view of the clutch shown in FIG. 1, taken generally on line A-A of FIG. 1.

Referring now to the drawings and, more particularly, to FIGS. 1-3 thereof, an improved clutch assembly is provided, an embodiment of which is generally indicated at 15. Assembly 15 generally includes base plate 18, fixed to hoist housing 16, clutch housing cap 19, worm drive 28 acting between base plate 18 and clutch housing cap 19, driving hub 20, driven hub 21, and spring 26 acting between clutch housing cap 19 and driving hub 20. Clutch assembly 15 is configured and arranged such that internal spring 26 and the spring force of clutch 15 can be regulated or adjusted externally via worm drive 28, thereby eliminating the need to remove any covers or components.

As shown in FIGS. 2-5, clutch housing cap 19 is a generally bell-shaped structure orientated about axis x-x, also referred to as clutch axis 22, and having cylindrical opening 68 at its top. With reference FIG. 4, housing cap 19 is generally bounded by inwardly-facing vertical cylindrical surface 54, downwardly-facing horizontal annular surface 55, inwardly-facing vertical cylindrical surface 56, downwardly-facing horizontal annular surface 57, inwardly-facing vertical cylindrical surface 58, downwardly-facing horizontal annular surface 59, inwardly and downwardly-facing rounded frusto-conical surface 60, inwardly-facing vertical cylindrical surface 61, downwardly-facing horizontal annular surface 62, outwardly-facing vertical cylindrical surface 63, outwardly and upwardly-facing frusto-conical surface 64, outwardly and upwardly-facing second frusta-conical surface 65, and upwardly-facing horizontal annular surface 66, joined at its inner marginal end to the upper marginal end of surface 54.

Figure 4:
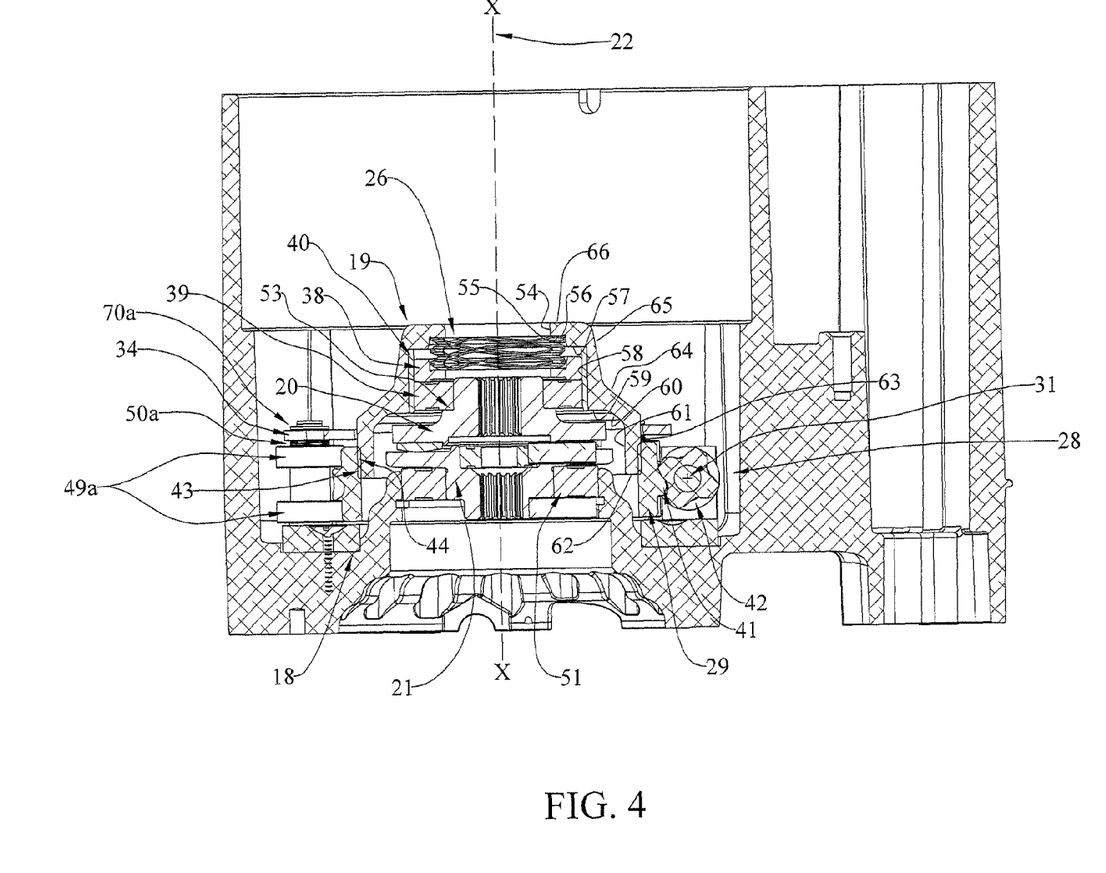
FIG. 4 is a vertical cross-sectional view of the clutch shown in FIG. 1, taken generally on line B-B of FIG. 1.
Figure 5:
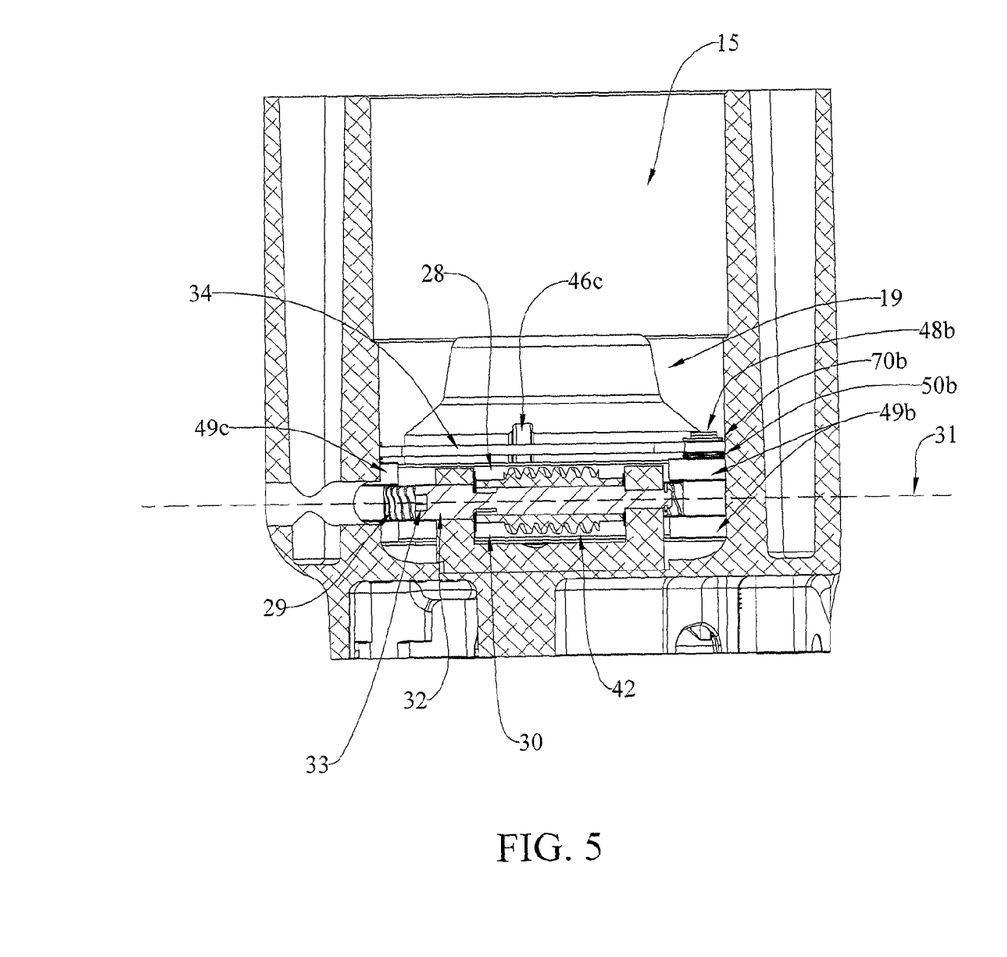
FIG. 5 is a vertical cross-sectional view of the clutch shown in FIG. 1, taken generally on line C-C of FIG. 1.

Surface 54 defines opening 68 in the top of cap housing 19. Surfaces 55 and 56 define annular spring seat 36. The bottom portion 43 of outwardly-facing vertical cylindrical surface 63 is threaded. Housing cap 19 contains concentric spring cup 38, bearing 39, bushing 40, spring 26 and driving hub 20.

As shown, spring cup 38 is a generally ring-shaped annular structure orientated about clutch axis 22 and has an inwardly and upwardly facing annular seat 69 for receiving one end of spring 26 and an outer cylindrical surface. Bearing 39 is a generally ring-shaped annular structure orientated about clutch axis 22 and has an outer cylindrical surface and an inner cylindrical surface. Bushing 40 is a generally elongated ring-shaped annular structure orientated about clutch axis 22 and has an outer cylindrical surface and an inner cylindrical surface.

In this embodiment, spring 26 is a cylindrical compression spring oriented about clutch axis 22. As shown, spring 26 is radially retained about clutch axis 22 by seat 36 in housing cap 19 at its top end and seat 69 in spring cup 38 at its bottom end. Spring 26 is compressed axially directly between seat 36 in housing cap 19 and seat 69 in spring cup 38.

The outer cylindrical surface of bushing 40 is affixed to inner surface 58 of housing cap 19. As shown, both bearing 39 and spring cup 38 are radially retained about clutch axis 22 by bushing 40 and are in axial sliding engagement with bushing 40 such that they can move axially along clutch axis 22 as a function of the compression force of spring 26. Thus, bushing 40 extends between the outer cylindrical surfaces of spring cup 38 and bearing 39 and the inner cylindrical surface 58 of housing cap 19. Bearing 39 is sandwiched axially between spring cup 38 and annular seat 53 of driving hub 20.

As shown, driving hub 20 is generally a ring-shaped annular structure orientated about clutch axis 22. The inner cylindrical surface of driving hub 20 is splined and forms a bore configured to receive the corresponding splined end of a motor shaft for rotational engagement therewith. Thus, when a motor shaft extends through opening 68 in housing cap 19 and engages the splined bore of driving hub 20, rotation of the motor shaft about clutch axis 22 causes corresponding rotation of driving hub 20 about clutch axis 22.

As shown, driven hub 21 is generally a cylindrical annular structure oriented about clutch axis 22. Driven hub 21 also has an inner cylindrical surface that is splined and forms a bore configured to receive the corresponding splined end of a drive shaft for rotational engagement. Thus, when the drive shaft engages the splined bore of driven hub 21, rotation of driven hub 21 about clutch axis 22 causes corresponding rotation of that drive shaft about clutch axis 22.

As shown, in this embodiment driving hub 20 includes a conventional annular non-metallic composite friction liner 35 bonded to driving hub 20 as shown. Friction liner 35 provides a desired contact area between the opposed torque transfer surfaces 23 and 24 of driving hub 20 and driven hub 21, respectively. While in this embodiment liner 35 is bonded to driving hub 20, alternatively it may be free floating or bonded to driven hub 21. Friction liner 35 may also be contoured to control the size, shape and location of the contact area and resulting torque at slip joint 25 between torque transfer surface 23 of driving hub 20 and torque transfer surface 24 of driven hub 21. For example, friction liner 35 may be tapered.

As shown, driving hub 20 includes annular ledge, journal or seat 53 in which bearing 39 is positioned. The inwardly-facing vertical cylindrical surface of bearing 39 is configured to bear against the outer cylindrical surface of seat 53 of driving hub 20 and the outer cylindrical surface of bearing 39 is configured to bear against the inner cylindrical surface of bushing 40. Thus, bearing 39 allows for rotation of driving hub 20 about clutch axis 22 relative to housing cap 19 and base plate 18.

As shown, bearing 51 is generally a ring-shaped annular structure orientated about clutch axis 22. As shown, bearing 51 is radially retained about clutch axis 22 by an inner cylindrical surface of hoist housing 16, which is fixed relative to base plate 18. Driven hub 21 includes annular ledge, journal or seat 52 in which bearing 51 is positioned. The inwardly-facing vertical cylindrical surface of bearing 51 is configured to bear against the outer cylindrical surface of seat 52 of driven hub 21 and the outer cylindrical surface of bearing 51 is configured to bear against an inner cylindrical surface of hoist housing 16. Thus, bearing 51 allows for rotation of driven hub 21 about clutch axis 22 relative to hoist housing 16 and base plate 18 while holding driven hub 21 in proper radial and axial alignment.

As shown, spring 26 bears on one side against surface 55 of housing cap 19 and on the other side against the opposing surface of seat 69 of spring cup 38. In operation, spring 26 presses axially against spring cup 38, causing spring cup 38 to in turn press axially against bearing 39, which in turn causes bearing 39 to press axially against driving hub 20. This in turn causes driving hub 20 and friction liner 35 to press axially against driven hub 21. This encourages driven hub 21 to rotate together with driving hub 20 due to contact friction at slip joint 25. However, when the driving torque exceeds the friction torque, driven hub 21 will slip relative to driving hub 20, resulting in the drive shaft no longer rotating at the same speed as the motor shaft.

In general, worm drive 28 comprises a conventional type worm 30 in threaded engagement with a conventional type worm gear 29. As shown in FIG. 1, worm shaft 30 is a generally cylindrical structure orientated about axis 31 and configured to rotate about axis 31. Shaft 30 is fixed axially such that it does not move along axis 31. Shaft 30 includes adjustment portion 32 and threaded portion 42. Adjustment portion 32 is located externally of housing cap 19 and at one end includes recess 33, which is configured to receive a tool for selectively applying an adjustment torque about axis 31 to shaft 30. In this embodiment, recess 33 is hexagonal and is configured to receive a hex wrench, but it is contemplated that other mechanisms or configurations may be used by which a torque is selectively applied to rotate shaft 30 about axis 31. Shaft 30 includes a second medial portion 42 having a shallow spiral thread that engages worm gear 29 in a non-intersecting, perpendicular axis configuration.

Worm gear 29 is a ring-shaped annular structure oriented about clutch axis 22 and operatively configured to rotate about clutch axis 22. As shown, worm gear 29 is configured to rotate about clutch axis 22 on outer bearings 49a-c and includes an outer center cylindrical surface having multiple circumferential spaced outwardly protruding teeth 41 orientated substantially parallel to clutch axis 22. Bearings 49a-c have upper and lower cylindrical portions that rotationally bear on the outer cylindrical edges of worm gear 29 with the center of the outer cylindrical surface of worm gear 29 having wheel teeth 41.

Worm gear 29 also includes inner threaded portion 44 on its inner cylindrical surface, with portion 44 in engagement with threaded portion 43 of outer cylindrical surface 63 of housing cap 19. The relative threads of inner cylindrical portion 44 of worm gear 29 and opposed outer cylindrical portion 43 of housing cap 19 spiral about clutch axis 22 and such that relative rotation of worm gear 29 about clutch axis 22 causes axial movement of housing cap 19 along clutch axis 22.

Locking ring or plate 34 is generally a ring-shaped annular structure orientated around clutch axis 22 and positioned externally or radially outside of housing cap 19 relative to clutch axis 22. Locking plate 34 is fixed to base plate 18 by three circumferentially spaced turn studs 48a-c that rotationally support bearings 49a-c, respectively. Bearings 49a-c keep worm gear 29 concentric with driving hub 20, driven hub 21 and housing cap 19 on clutch axis 22. Wave springs 50a-c are positioned on turn studs 48a-c between the bottom of plate 34 and bearings 49a-c, respectively, and bias locking plate 34 away from base plate 18. E-clips 70a-c secure locking plate 34 to the ends of turn studs 48a-c, respectively.

As shown, base plate 18 is generally a ring-shaped annular structure orientated around clutch axis 22. Base plate 18 is bolted to hoist housing 16 with bolts 71a-d. Thus, base plate 18 and hoist housing 16 are fixed relative to each other. Driven hub 21 and base plate 18 are also axially fixed relative to each other.

As shown in FIGS. 1 and 2, locking plate 34 has three circumferentially spaced radially inwardly-extending protrusions 45a-c on its inner cylindrical surface. Outer surface 63 of housing cap 19 includes three axially-extending grooves 46a-c that correspond to and receive protrusions 45a-c, respectively, of locking plate 34. Protrusions 45a-c are configured with grooves 46a-c such that protrusions 45a-c may slide axially in grooves 46a-c with axial movement of housing cap 19 relative to clutch axis 22. However, protrusions 45a-c fit within grooves 46a-c, respectively, so as to constrain rotational movement of housing cap 19 about clutch axis 22. Thus, clutch housing cap 19 is axially moveable along clutch axis 22 relative to base plate 18 and hoist housing 16 and is rotationally constrained relative to base plate 18 and hoist housing 16. Due to locking plate 34, housing cap 19 is restrained from rotational movement relative to base plate 18.

As shown, in operation, rotation of shaft 30 about axis 31, which can be performed externally with a hex wrench inserted into hex recess 33 in the end of shaft 30, causes rotation of worm gear 29. Because of the threaded connection between threaded portion 44 of the inner cylindrical surface of worm gear 29 and the overlapping threaded portion 43 of outer cylindrical surface 63 of housing cap 19, rotation of worm gear 29 about clutch axis 22 causes axial movement of housing cap 19 relative to base plate 18. Such movement in the clockwise direction about clutch axis 22 increases the pressure of spring 26 against driving hub 20, and such movement in the counter-clockwise direction decreases the spring pressure and bias of spring 26 against driving hub 20. This allows for the spring bias of spring 26 to be adjusted externally as desired. Thus, rotation of worm shaft 30 externally to cap housing 19 in the clockwise direction increases the spring pressure within cap housing 19, and rotation of worm shaft 30 externally in the counter-clockwise direction decreases the spring pressure within cap housing 19. Thus, for example, if over time either spring 26 loses its elasticity or if any of the liners or hub interfaces of clutch 15 are worn away, worm shaft 30 may be adjusted externally to maintain the desired bias of spring 26 internally to cap housing 19. This adjustment may be done without having to removed housing 19 and/or housing 16. In addition, worm gear 29 does not loosen easily and therefore there is no need for a separate mechanism to lock the spring adjustment of clutch 15.

While a single driving hub 20 and driven hub 21 are shown and described, multiple pressure plates and friction hubs may be used to adjust torque transfer as desired. Furthermore, spring 26 may be separated from clutch housing cap 19 and driving hub 20 by more or fewer elements than spring cup 38 and bearing 39 shown and described. In such cases, spring 26 may still be disposed axially between clutch housing cap 19 and driving hub 20 as it may still exert a spring force on driving hub 20 and driven hub 21, and that spring force may be adjustable by the axial movement of housing cap 19 relative to driven hub 21.

The present invention contemplates that many changes and modifications may be made. Therefore, while the presently-preferred form of the externally adjustable clutch assembly has been shown and described, and several modifications and alternatives discussed, persons skilled in this art will readily appreciate that various additional changes and modifications may be made without departing from the scope of the invention, as defined and differentiated by the following claims.

What is claimed is:

1. An adjustable clutch assembly comprising:
a base portion;
a clutch housing cap;
a first rotary member having a first torque transfer surface;
said first rotary member configured to rotate about a clutch axis and to rotationally couple to a first shaft;
a second rotary member having a second torque transfer surface opposing said first torque transfer surface of said first rotary member at a slip joint;
said second rotary member configured to rotate about said clutch axis and to rotationally couple to a second shaft;
a spring element disposed axially between said clutch housing cap and said first rotary member and configured to bias said opposed first and second torque transfer surfaces axially towards each other;
a gear drive comprising a wheel configured to rotate about said clutch axis and a shaft in engagement with said wheel and configured to rotate about an adjustment axis to thereby selectively rotate said wheel about said clutch axis;
said wheel in engagement with said clutch housing cap;
said shaft having a first portion to which an adjustment torque may be applied;
a locking element constraining rotational movement of said clutch housing cap relative to said base portion; and
said gear drive, said base portion, said locking element and said clutch housing cap configured such that selective rotation of said wheel about said clutch axis causes axial movement of said clutch housing cap along said clutch axis relative to said base portion or said second rotary member;
whereby said bias of said spring may be adjusted by rotation of said shaft.

2. The assembly set forth in claim 1, wherein said first rotary member is a driving member and said second rotary member is a driven member.

3. The assembly set forth in claim 1, wherein said first torque transfer surface comprises a friction liner layer.

4. The assembly set forth in claim 1, wherein said spring element comprises a cylindrical compression spring oriented about said clutch axis.

5. The assembly set forth in claim 4, wherein said clutch housing cap comprises a spring seat axially retaining a first end of said spring and further comprising a spring cup receiving a second end of said spring.

6. The assembly set forth in claim 5, and further comprising a bearing disposed axially between said spring cup and said first rotary member and disposed radially between said first rotary member and said clutch housing cap.

7. The assembly set forth in claim 6, and further comprising a cylindrical bushing disposed radially between said bearing and said clutch housing cap.

8. The assembly set forth in claim 1, wherein said wheel comprises an outer cylindrical surface having outwardly extending circumferentially spaced teeth and said shaft comprises an outer cylindrical surface having a threaded portion, and wherein said engagement of said wheel with said shaft comprises said threaded portion of said shaft rotationally engaging said teeth of said wheel.

9. The assembly set forth in claim 1, wherein said first portion of said shaft comprises a recess configured to receive a torqueing tool.

10. The assembly set forth in claim 1, wherein said clutch housing cap comprises an outer cylindrical surface having a threaded portion and said wheel comprises an inner cylindrical surface having a threaded portion, and wherein said engagement of said wheel with said clutch housing cap comprises said threaded portion of said inner cylindrical surface of said wheel rotationally engaging said threaded portion of said outer cylindrical surface of said clutch housing cap.

11. The assembly set forth in claim 1, wherein said locking element comprises an annular locking plate fixed to said base portion and engaging an outer surface of said clutch housing cap.

12. The assembly set forth in claim 11, wherein said annular locking plate comprises multiple protrusions extending radially inwards towards said clutch axis and said outer surface of said clutch housing cap comprises multiple axially extending grooves, wherein said protrusions may slide axially relative to said clutch axis in said grooves and are constrained from rotational movement about said clutch axis by said grooves, whereby said clutch housing cap is axially movable relative to said base portion and rotationally constrained relative to said base portion.

13. The assembly set forth in claim 11, wherein said annular locking plate is fixed to said base portion via a plurality of shaft elements.

14. The assembly set forth in claim 11, wherein said wheel is rotationally supported by a plurality of bearings and said bearings are supported between said annular locking plate and said base portion on said respective shaft elements.

15. The assembly set forth in claim 14, wherein said shaft elements comprise turn studs and further comprising multiple spring elements disposed between said annular locking plate and said respective bearings on said respective turn studs and configured to bias said locking plate away from said base portion.

16. The assembly set forth in claim 1, and further comprising a hoist housing fixed to said base portion and a second bearing disposed radially between said second rotary member and said hoist housing.

17. The assembly set forth in claim 16, wherein said second rotary member comprises an outer journal for receiving said second bearing.

18. The assembly set forth in claim 1, wherein:
   said first rotary member and said spring element are disposed between said base portion and said clutch housing cap;
   said clutch housing cap has an inner surface and said first rotary member has a surface opposing said inner surface of said clutch housing cap;
   said spring element acts between said inner surface of said clutch housing cap and said surface of said first rotary member opposing said inner surface of said clutch housing cap; and
   wherein said clutch housing cap and said first rotary member are configured such that axial movement of said clutch housing cap relative to said first rotary member adjusts said bias of said spring element.

19. The assembly set forth in claim 18, wherein said gear drive is disposed outside of said clutch housing cap.

* * * * *